United States Patent
Mewar et al.

(10) Patent No.: US 10,725,791 B2
(45) Date of Patent: Jul. 28, 2020

(54) OPERATING SYSTEM BOOT UP OPTIMIZATIONS

(71) Applicant: Harman International Industries, Incorporated, Stamford, CT (US)

(72) Inventors: Rohit Mewar, Bangalore (IN); Eugine Varghese, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 295 days.

(21) Appl. No.: 15/785,412

(22) Filed: Oct. 16, 2017

(65) Prior Publication Data
US 2019/0056957 A1    Feb. 21, 2019

(30) Foreign Application Priority Data
Aug. 16, 2017   (IN) .............................. 201741028982

(51) Int. Cl.
*G06F 9/44* (2018.01)
*G06F 9/4401* (2018.01)

(52) U.S. Cl.
CPC .......... *G06F 9/4406* (2013.01); *G06F 9/4401* (2013.01); *G06F 9/442* (2013.01)

(58) Field of Classification Search
CPC ................................ G06F 9/442; G06F 9/4401
See application file for complete search history.

(56) References Cited

U.S. PATENT DOCUMENTS

| 7,533,215 B2 | 5/2009 | Faber | |
| 2005/0273587 A1* | 12/2005 | Wynn | ...................... G06F 9/442 713/2 |
| 2014/0359262 A1 | 12/2014 | Zhang | |
| 2018/0004535 A1* | 1/2018 | Hati | ...................... G06F 9/4401 |

FOREIGN PATENT DOCUMENTS

EP    2 759 929 A2    7/2014

OTHER PUBLICATIONS

Extended European search report for application No. 18187302.7 dated Jan. 24, 2019.

* cited by examiner

*Primary Examiner* — Albert Wang
(74) *Attorney, Agent, or Firm* — Artegis Law Group, LLP

(57) ABSTRACT

In one embodiment, an operating system is booted based on results of boot-up operations performed during a shutdown. In operation, during a shutdown phase of an operating system, one or more boot-up operations are performed, and the results of these operations are stored in memory. During a boot-up phase of the operating system, the results are received, and the operating system is booted based on the one or more results.

20 Claims, 5 Drawing Sheets

OPERATING SYSTEM BOOT UP OPTIMIZATIONS

BACKGROUND

Cross-Reference to Related Applications

This application claims priority benefit of the Indian Provisional Patent Application titled, "Operating system boot optimizations for automotive infotainment systems by processing application integrity & check during inactive states like shutdown," filed on Aug. 16, 2017, and having Application No. 201741028982. The subject matter of this related application is hereby incorporated herein by reference.

FIELD OF THE VARIOUS EMBODIMENTS

The various embodiments relate generally to operating systems, and more specifically, to optimizations for operating system boot up operations.

DESCRIPTION OF THE RELATED ART

An operating system installed in a computing system may perform multiple operations when booting or starting up. These boot-up operations, among other things, prepare the operating system and one or more applications installed on the computing system for use by users of the computing system. Examples of these boot-up operations may include application parsing, application scanning, application validation, and application optimization. Application parsing and application scanning operations may include, for example fetching the application data and scanning the application data for compatibility via certificate and signature matching. Application validation and application optimization operations may include, for example, ascertaining which applications are installed in the system, validating the integrity of these installed applications, and optimizing these applications for execution.

As the number of applications installed in the computing system increases, the boot-up time increases due to the amount of time needed to perform the boot-up operations across the installed applications. In a system where cycles of shutdown and boot-up occur relatively often, the time taken up by the boot-up operations can be a hindrance to enjoyment of the system.

An example of a system or environment in which shutdown and boot-up cycles occurs relatively often is a vehicular environment, in which shutdown occurs whenever, for example, the user turns off the vehicle. Further, infotainment systems that offer the capability to install applications from an application marketplace are increasingly being deployed in vehicular environments. In such infotainment systems, in order to enable operation of the corresponding human-machine interface, the operating system for the infotainment system performs various boot-up operations, such as application scanning and application validation operations, when booting up. With the relative frequency of shutdown and boot up cycles in a vehicular environment and the increasing use of installed applications in such an environment, the time consumed by boot-up operations can be significant, and the boot time increases further as the user installs even more applications in the vehicular environment infotainment system.

As the foregoing illustrates, what is need in the art are more efficient ways to perform boot-up operations of an operating system.

SUMMARY

One embodiment sets forth a method for booting an operating system. The method includes, during a shutdown phase of an operating system, performing one or more boot-up operations to generate one or more results, and storing the one or more results in a memory. The method further includes, during a boot-up phase of the operating system, receiving the one or more results from the memory, and booting the operating system based on the one or more results.

Further embodiments provide, among other things, a system and a computer-readable storage medium configured to implement the method set forth above.

At least one advantage of the disclosed techniques is that the time consumed by boot-up of the operating system is reduced. Particularly, boot-up operations are performed during the shutdown phase, when these operations are less disruptive to users. Based on the results of these operations, at least some boot-up operations may be omitted during the next boot-up phase. Consequently, time consumed during the boot-up phase is reduced.

BRIEF DESCRIPTION OF THE DRAWINGS

So that the manner in which the above recited features can be understood in detail, a more particular description of the various embodiments, briefly summarized above, may be had by reference to embodiments, some of which are illustrated in the appended drawings. It is to be noted, however, that the appended drawings illustrate only typical embodiments and are therefore not to be considered limiting of its scope, for the contemplated embodiments may admit to other equally effective embodiments.

DETAILED DESCRIPTION

In the following description, numerous specific details are set forth to provide a more thorough understanding of the various embodiments. However, it will be apparent to one of skill in the art that various embodiments may be practiced without one or more of these specific details.

System Overview

Figure 1:
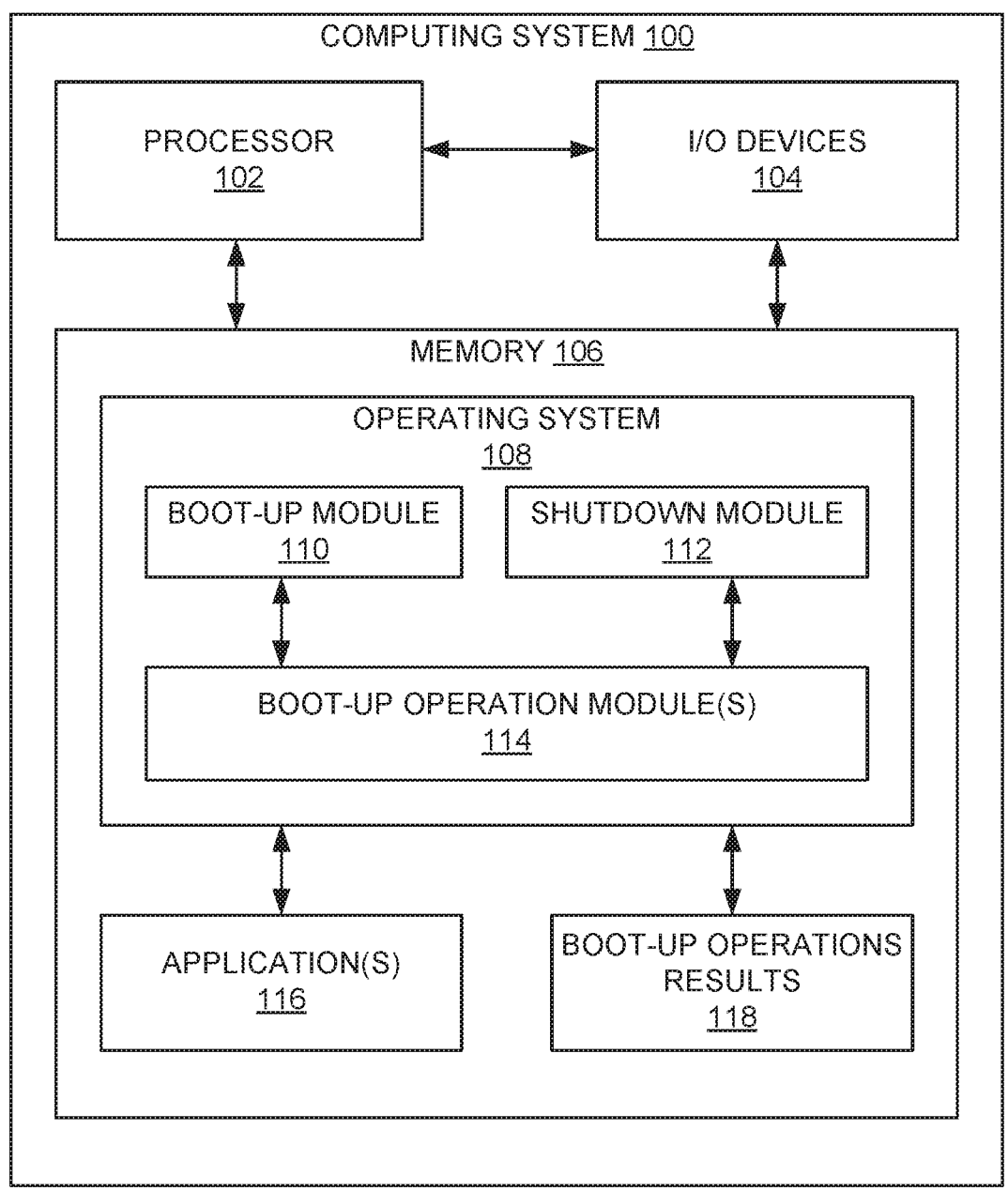
FIG. 1 is a block diagram of a computing system configured to implement one or more aspects of the various embodiments.

FIG. 1 is a block diagram of a computing system 100 configured to implement one or more aspects of the various embodiments. As shown, the computing system 100 includes a processor 102, input/output (I/O) devices 104, and a memory 106. The memory 106 includes an operating system 108, one or more applications 116, and boot-up operations results 118. The operating system 108 includes a boot-up module 110, a shutdown module 112, and one or more boot-up operations modules 114.

In some embodiments, the computing system 100 is a computing device. For example, computing system 100 may be any of a desktop computer, a laptop computer, server, workstation, terminal, a tablet computer, a smartphone, or other kind of computing device. In some embodiments, the computing system 100 is a system or device embedded or installed in another system or device. For example, computing system 100 may be an in-vehicle infotainment system installed in a vehicle. More generally, the computing system 100 may be any computing device, electronic device, or system that includes memory and one or more processors and is configured to execute (e.g., via the processor(s)) instructions (e.g., an operating system, applications, etc.) stored in the memory.

The processor 102 may be any technically feasible form of processing device configured to process data and execute program code. The processor 102 may include, for example, and without limitation, one or more of a system-on-chip (SoC), a central processing unit (CPU), a graphics processing unit (GPU), an application-specific integrated circuit (ASIC), a digital signal processor (DSP), a field-programmable gate array (FPGA), and so forth. In general, processor 102 may be any technically feasible hardware unit capable of processing data and/or executing program code, including an operating system 108 and applications 116.

I/O devices 104 may include input devices, output devices, and devices capable of both receiving input and providing output. For example, and without limitation, I/O devices 104 may include wired and/or wireless communication devices that send data to and/or receive data from remote databases, other computing systems or devices, etc. I/O devices 104 may also include one or more input and/or output devices for receiving input and outputting output. Examples of input devices include keyboards, mice, trackballs, joysticks, trackpads, touch-sensitive surfaces or displays, microphones or other audio input devices, cameras, physical controls (e.g., buttons, dials, etc.), sensors, and so forth. Examples of output devices include display screens, speakers, headphones, tactile output devices, light emitting devices, and so forth. Further, I/O devices 104 may include networking devices having one or more connectors through which data signals and/or control signals are sent and/or received, for example, between a network switch and/or between one or more computing systems 100.

Memory 106 may include a memory module or a collection of memory modules. The memory 106 stores content, such as data and program code, for execution or use by the processor(s) 102. Memory 106 includes an operating system 108 to implement the overall functionality of the computing system 100 and, thus, to coordinate the operation of the computing system 100 as a whole. In some embodiments, the operating system 108 is the ANDROID™ operating system by Google Inc.

The memory 106 includes one or more applications 116. The applications 116 provide respective functionality and features in the computing system 100 according to the specific application 116 executed by the processor 102. In some embodiments, the applications 116 are installed into the computing system 100 in accordance with user or manufacturer direction. For example, one or more of the applications 116 may be installed by the manufacturer of the computing system 100, and the other applications amongst applications 116 may be installed by a user of the computing system 100. Applications for installation by a user may be obtained from an online "app store" (e.g., an online repository or store of applications from which users may obtain, for free or in exchange for payment, applications for installation), from non-volatile storage media (e.g., optical disk, flash drive, flash memory), or from another system or device (e.g., an application transmitted from a device communicatively coupled to computing system 100). In some embodiments, an application may be installed and stored in the memory 106 as a package of associated program code files and data files.

The operating system 108 includes a boot-up module 110. The boot-up module 110 implements a boot-up procedure or phase of the operating system 108 and coordinates the operation of the boot-up procedure or phase of the operating system 108. The boot-up module 110 operates the boot-up procedure or phase that starts after the computing system 100 is powered on (e.g., powered on from a power-off state, following a restart or reboot of the computing system 100). In some embodiments, the boot-up procedure or phase may include multiple sub-phases that proceed in sequence.

The operating system 108 also includes a shutdown module 112. The shutdown module 112 implements a shutdown procedure or phase of the operating system 108 and coordinates the operation of the shutdown procedure or phase of the operating system 108. The shutdown module 112 operates the shutdown procedure or phase during a shutdown phase that starts after the computing system 100 is directed to power off (e.g., system is directed to shut down or restart). In some embodiments, the shutdown procedure or phase may include multiple sub-phases that proceed in sequence.

The operating system 108 further includes one or more boot-up operations modules 114. The boot-up operations modules 114 perform particular boot-up operations associated with the booting of the operating system 108. In some embodiments, the boot-up operations facilitate the booting of the operating system 108 and the preparation of applications 116 for use. In some embodiments, the boot-up operations modules 114 perform boot-up operations on the applications 116. In some embodiments, boot-up operations include respective modules for application parsing, application scanning, application validation, and application optimization; and boot-up operations modules 114 include one or more modules for performing these operations. Application parsing may include fetching data (e.g., metadata) corresponding to the applications 116. Application scanning may include scanning applications data of the applications 116 for compatibility via certificate and signature matching. Application validation may include validating the integrity of the applications 116. Application optimization may include optimizing the applications 116 for execution in the computing system 100. In some embodiments, a respective boot-up operation is performed for each of the applications 116.

In some embodiments, a boot-up operations module 114 generates results data as a result of performing a corresponding boot-up operation. For example, an application validation module may generate validation results data as a result of performing an application validation operation. The validation results data indicates, for example, when the results data was generated (e.g., a timestamp), and whether the validation succeeded or failed, or other result of the operation (e.g., validation was incomplete). More generally, results data for a boot-up operation indicates a date and time of the operation or of generation of the result data, metadata related to the operation (e.g., names and sizes of the files operated upon) and whether an operation succeeded, failed, or some other conclusion (e.g., operation incomplete). In some embodiments, an operation is successful if the operation is successfully completed (e.g., validated an application, optimized an application, completed scan of an application and confirmed compatibility of the application, etc.), and the operation is a failure otherwise (e.g., an application failed to validate, an application failed to be optimized, compatibility of an application is not confirmed, the operation is incomplete due to interruption). In some embodiments, a boot-up operation may be performed for each of one or more applications (e.g., each one of the applications 116), and respective results data associated with the operation may be generated for each of the applications 116. For example, for a validation operation on each of the applications 116, validation results data is generated for each of the applications 116. Results data generated by the boot-up operations modules 114 may be stored (e.g., cached) in boot-up operations results 118 in memory 106.

During a shutdown phase, one or more boot-up operations are performed. The boot-up operations are performed during the shutdown phase by the boot-up operations modules 114, and results data generated by the performing are stored in boot-up operations results 118 in memory 106. In some embodiments, if a result for a prior boot-up operation performed in a previous shutdown phase is stored in memory 106, then a result generated by the prior boot-up operation and stored in memory 106 may be discarded from memory 106 in favor of a result generated by the boot-up operation performed in the current shutdown phase. For example, a prior result generated by a boot-up operation on an application in the last shutdown phase may be stored in memory 106. In the current shutdown phase, the prior result may be discarded from memory 106, and a result generated by the boot-up operation on the application in the current shutdown phase is stored in memory 106. In some embodiments, the shutdown module 112 signals the boot-up operations modules 114 to perform the boot-up operations during the shutdown phase.

After the shutdown phase is completed and the computing system 100 is shut down, the computing system 100 is booted, and the operating system 108 starts a boot-up phase. During the boot-up phase, boot-up operations results 118 are received from memory 106 and read, and the operating system 108 boots in accordance with the boot-up operations results. In some embodiments, booting the operating system 108 in accordance with the boot-up operations results includes determining if a respective boot-up operations result meets any of one or more failure conditions. If the result meets any failure condition, the boot-up operation associated with the result is performed during the boot-up phase. Additionally, any boot-up operation for which no result is received from memory 106 is also performed. There may be any of a number of reasons for not receiving a certain result, including for example the memory portion storing the result was cleared (e.g., cache storing the result was cleared in accordance with a cache replacement policy), or the operation was not performed during the shutdown phase at all (e.g., the boot-up is the first ever boot-up of the operating system 108 at the computing system 100 and, thus, there was no preceding shutdown phase). If the result meets none of the failure conditions, the result is used for booting the operating system 108, and the boot-up operation associated with the result is not performed during the boot-up phase. In this manner, boot-up operations are performed during the shutdown phase and associated results are generated and stored in memory. The stored results are read, and some or all of the boot-up operations may be omitted from being performed during the boot-up phase based on the results.

In some embodiments, the failure conditions include one or more of the following: a result indicates that the corresponding operation is not successful (e.g., the operation failed, the operation is incomplete), a result has expired, or that a result is invalid. In some embodiments, a result has expired if the result is, based on the timestamp of the result, older than a predefined age threshold (e.g., two hours old, four hours old). In some embodiments, a result is invalid if result includes conflicting metadata (e.g., an application operated upon during the shutdown phase, as identified in the metadata in the result, is detected during the boot-up phase as having different characteristics, such as having a different file size and/or different package contents).

In some embodiments, in certain situations boot-up operations results 118 in memory 106 are discarded entirely during the boot-up phase, and corresponding boot-up operations are performed during the boot-up phase regardless of whether the result meets a failure condition. For example, a shutdown phase and a subsequent boot-up phase may be the result of a software update or upgrade (e.g., an update of the operating system 108, an update of an application 116, etc.) that requires a reboot. Boot-up operations results 118 that are stored in memory 106 may be discarded (e.g., as if the results are not obtainable from the memory 106) during the boot-up phase corresponding to the required reboot. Boot-up operations are performed during the boot-up phase corresponding to the required reboot in accordance with the unavailability of boot-up operations results 118.

In some embodiments, the shutdown phase includes multiple sub-phases. For example, in one sub-phase, the shutdown module 112 causes processing of events and signals by the operating system 108 and applications 116 to cease. In another sub-phase, the shutdown module 112 causes execution of applications 116 to cease. In yet another sub-phase, the boot-up operations modules 114 performs the boot-up operations, and the results generated from the performing are stored in memory 106. The sub-phase for ceasing processing events and signals and the sub-phase for ceasing execution of applications 116 both precede the sub-phase for performing the boot-up operations and storing the results.

Boot-Up Operations

Figure 2:
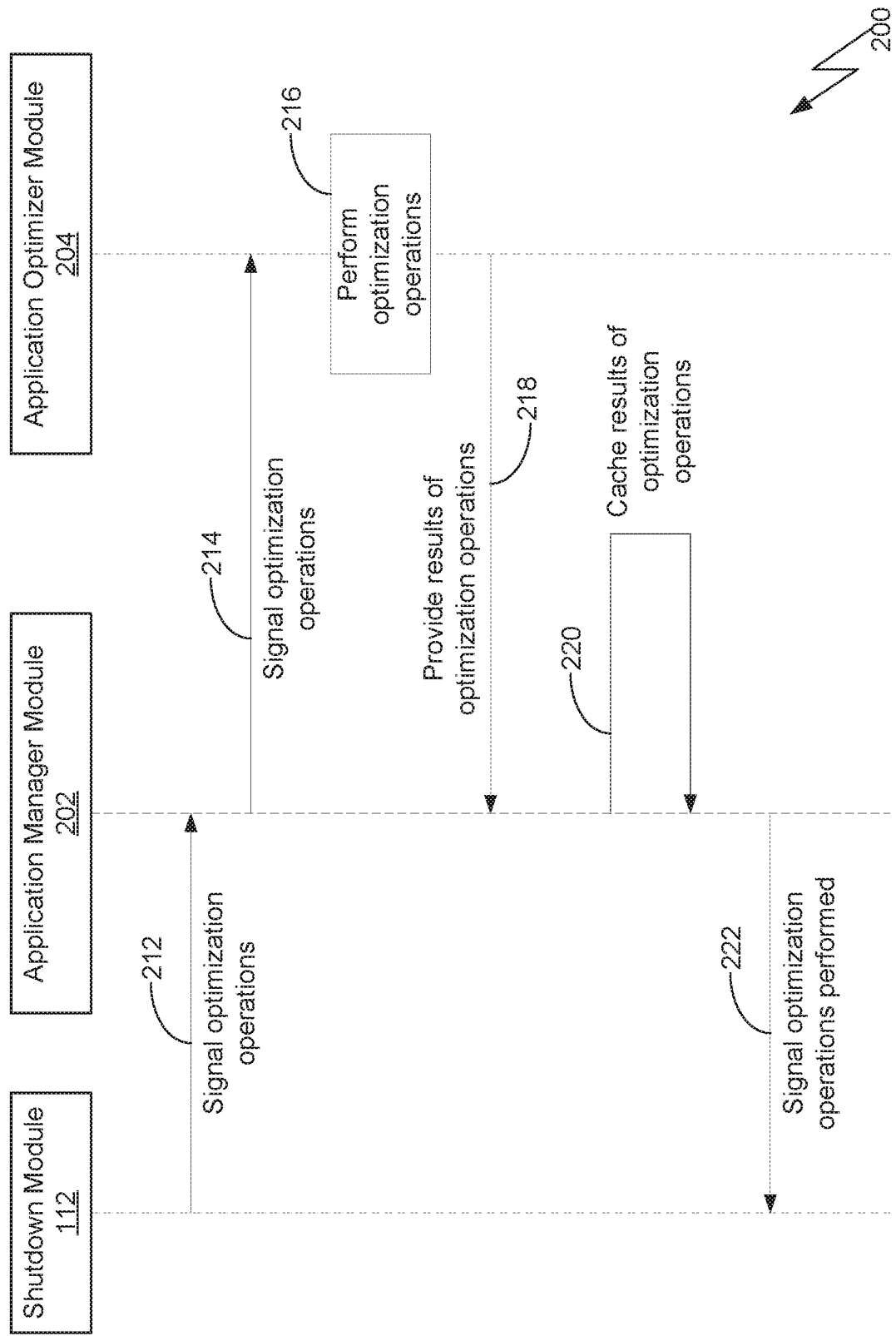
FIG. 2 is a flow diagram illustrating an example of boot-up operations being performed during a shutdown phase in accordance with some embodiments.

FIG. 2 is a flow diagram 200 illustrating an example of boot-up operations being performed during a shutdown phase in accordance with some embodiments. Flow diagram 200 includes operations performed by the shutdown module 112, an application manager module 202, and an application optimizer module 204. In some embodiments, the application manager module 202 and application optimizer module 204 are respective modules of the boot-up operations modules 114. For sake of illustration, flow diagram 200 shows in particular application optimization operations being performed during the shutdown phase. In some embodiments, the application manager module 202 is a "PackageManager" module for the ANDROID™ operating system. In some embodiments, the application optimizer module 204 is a "DexOptimizer" module for the ANDROID™ operating system.

In flow diagram 200, during the shutdown phase, the shutdown module 112 signals (212) the application manager module 202 to have application optimization operations performed on applications in memory 106 (e.g., applications 116). The application manager module 202 receives the signal form the shutdown module 112. In some embodiments, the application manager module 202 manages the applications 116 (e.g., inventories and tracks the applications 116). The application manager module 202 signals (214) an application optimizer module 204 to perform optimization operations on the applications 116.

The application optimizer module 204 receives the signal, and performs the optimization operations (216) on the applications 116 (e.g., perform an optimization operation on each of the applications 116). The application optimizer module 204 generates results data for the performed operations on the applications 116, and provides (218) the results data to the application manager module 202.

The application manager module 202 stores (220) (e.g., caches) the results data in boot-up operations results 118 in memory 106. The application manager module 202 signals (222) to the shutdown module 112 that the optimization operations have been performed and that the corresponding results data are stored in boot-up operations results 118 in memory 106. The shutdown module 112 may then continue with the shutdown phase (e.g., by invoking or signaling for more boot-up operations for performance during the shutdown phase, moving on to other shutdown phase operations, etc.).

Figure 3:
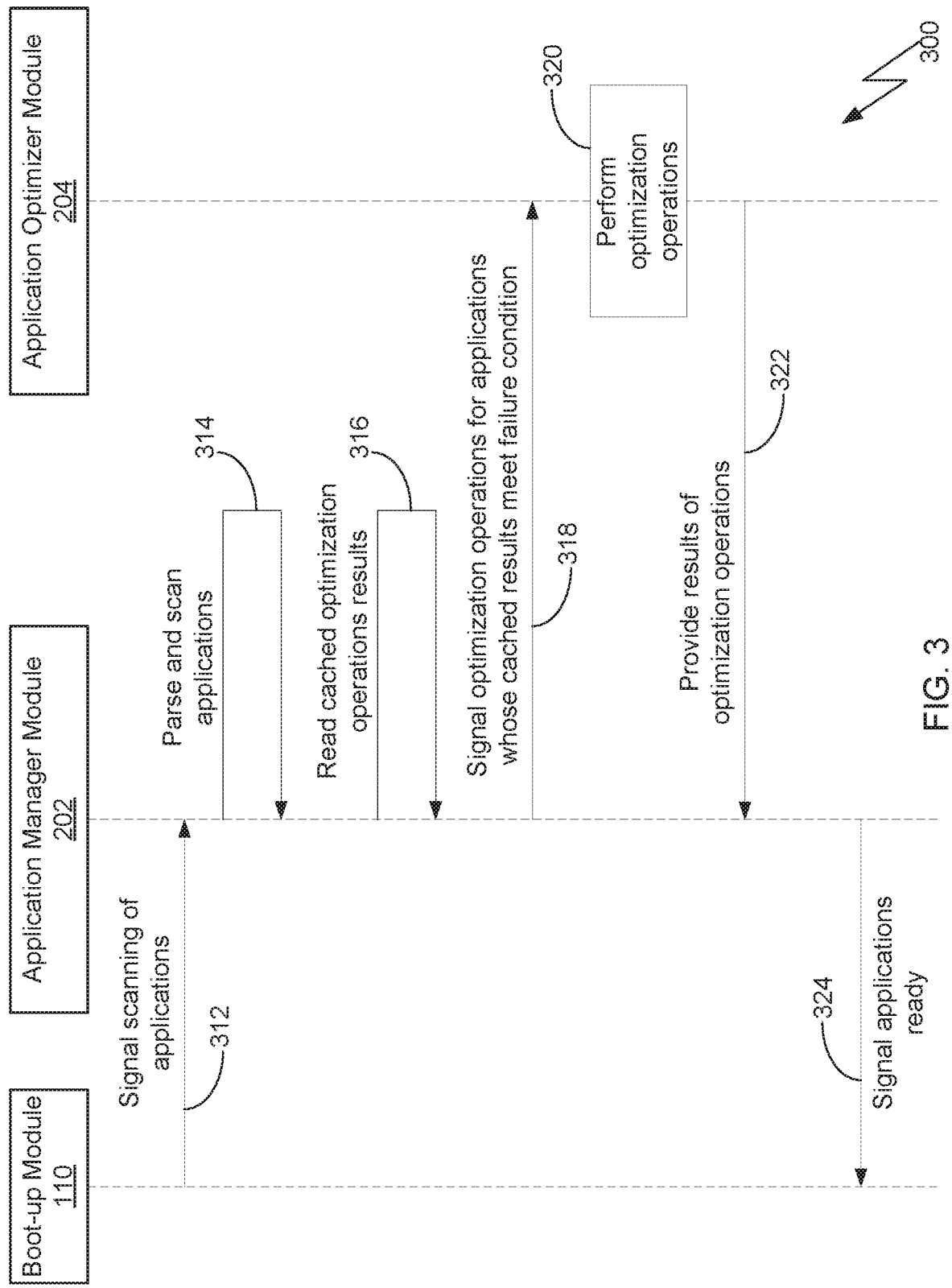
FIG. 3 is a flow diagram illustrating an example of boot-up operations being performed or omitted during a boot-up phase in accordance with some embodiments.

FIG. 3 is a flow diagram 300 illustrating an example of boot-up operations (e.g., application optimization operations) being performed or omitted during a boot-up phase in accordance with some embodiments. Flow diagram 300 includes operations performed by the boot-up module 110, an application manager module 202, and an application optimizer module 204.

The boot-up module 110 signals (312) application manager module 202 to scan applications in memory 106 (e.g., applications 116). The application manager module 202 receives the signal and performs application parsing and application scanning operations (314) on applications 116 in order to inventory the applications 116. In some embodiments, the application manager module 202 inventories applications 116 by parsing applications 116 to identify the applications 116 stored in memory 106 and to fetch metadata for the applications 116 (e.g., application names, contents of application packages, file names, file sizes, etc.). In some embodiments, the application manager module 202 scans applications 116 to check the applications 116 for compatibility via certificate and signature matching.

The application manager module 202 obtains (e.g., receives) stored boot-up operations results 118, which includes results from the optimization operations illustrated in FIG. 2, from memory 106. The application manager module 202 reads (316) the received boot-up operations results 118 and determines, for each result from the optimization operations illustrated in FIG. 2, if the result meets a failure condition. For a result that meets a failure condition, the application manager module 202 signals (318) application optimizer module 204 to perform an optimization operation on an application 116 to which the result applies. For example, if a result for an optimization operation on Application A meets a failure condition, application optimizer module 204 is signaled to perform the optimization operation on Application A. The application optimizer module 204 performs optimization operations in response to the signals from the application manager module 202, generates results data for the performed operations, and provides (322) the results data to the application manager module 202.

For a result that is associated with an optimization operation and meets none of the failure conditions, the application manager module 202 forgoes signaling application optimizer module 204 to perform an optimization operation on an application 116 to which the result applies; the optimization operation is omitted during the boot-up phase for the application to which the result applies. Instead, the application manager module 202 adopts and uses the result as if the corresponding optimization operation was performed during the boot-up phase.

After the application manager module 202 has a result, whether newly provided from application optimizer module 204 in step 322 or adopted from the cached results read in step 316, for each of the applications 116, the application manager module 202 signals (324) the boot-up module 110 that the applications 116 are prepared with respect to optimization. The boot-up module 110 boots the operating system 108 using the newly provided results and the adopted results.

While FIGS. 2-3 illustrate optimization operations being performed or omitted during the boot-up phase based on the results of optimization operations that are generated during the shutdown phase, the flows illustrated in FIGS. 2-3 and the corresponding description above are applicable to other boot-up operations as well (e.g., application validation operations, etc.). Furthermore, in some embodiments, the boot-up module 110 and shutdown module 112 coordinates the boot-up operations modules 114. For example, in FIG. 3, the application manager module 202 may report the result of the parsing and scanning in step 314 to the boot-up module 110. The boot-up module 110 then reads the cached optimization operation results (e.g., the boot-up module 110 performs step 316 in lieu of the application manager module 202). The boot-up module 110 signals the application optimizer module 204 of optimization operations to be performed (e.g., the boot-up module 110 performs step 318 in lieu of the application manager module 202). The application optimizer module 204, after performing the optimization operations in step 320, provides the results to the boot-up module 110 instead of application manager module 202. The boot-up module 110 may determine that the applications are ready for use based on the provided results and the adopted results, and continue with the booting up of the operating system. Similarly, in FIG. 2, the shutdown module 112 may, in lieu of the application manager module 202, signal the application optimizer module 204 to perform optimizer operations, receive results from the application optimizer module 204, and cache the results in memory 106.

Figure 4:
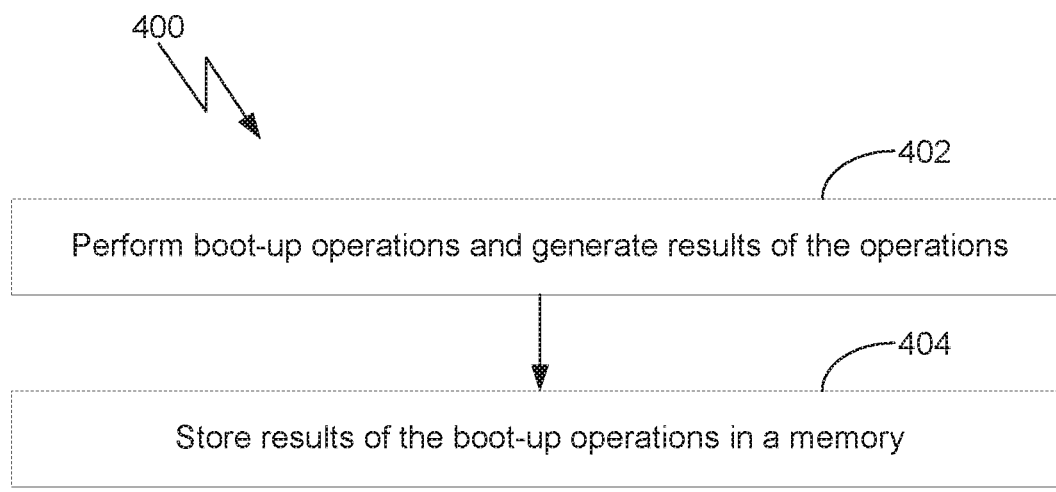
FIG. 4 is a flow diagram illustrating method steps for performing boot-up operations during a shutdown procedure in accordance with some embodiments.

FIG. 4 is a flow diagram illustrating method steps for performing boot-up operations during a shutdown procedure in accordance with some embodiments. Although the method steps are described with respect to the system of FIG. 1, persons skilled in the art will understand that any system configured to implement the method steps, in any order, falls within the scope of the contemplated embodiments.

As shown, a method 400 begins at step 402, where, during a shutdown phase of an operating system 108 at a computing system 100, one or more boot-up operations modules 114 perform boot-time operations (e.g., on applications 116) and generate results corresponding to the performed operations.

At step 404, the operating system 108 stores (e.g., caches) the results in boot-up operations results 118 in memory 106. In some embodiments, the boot-up module 110 stores the results. In some other embodiments, the respective boot-up operations modules 114 store their respective results in memory 106.

Figure 5:
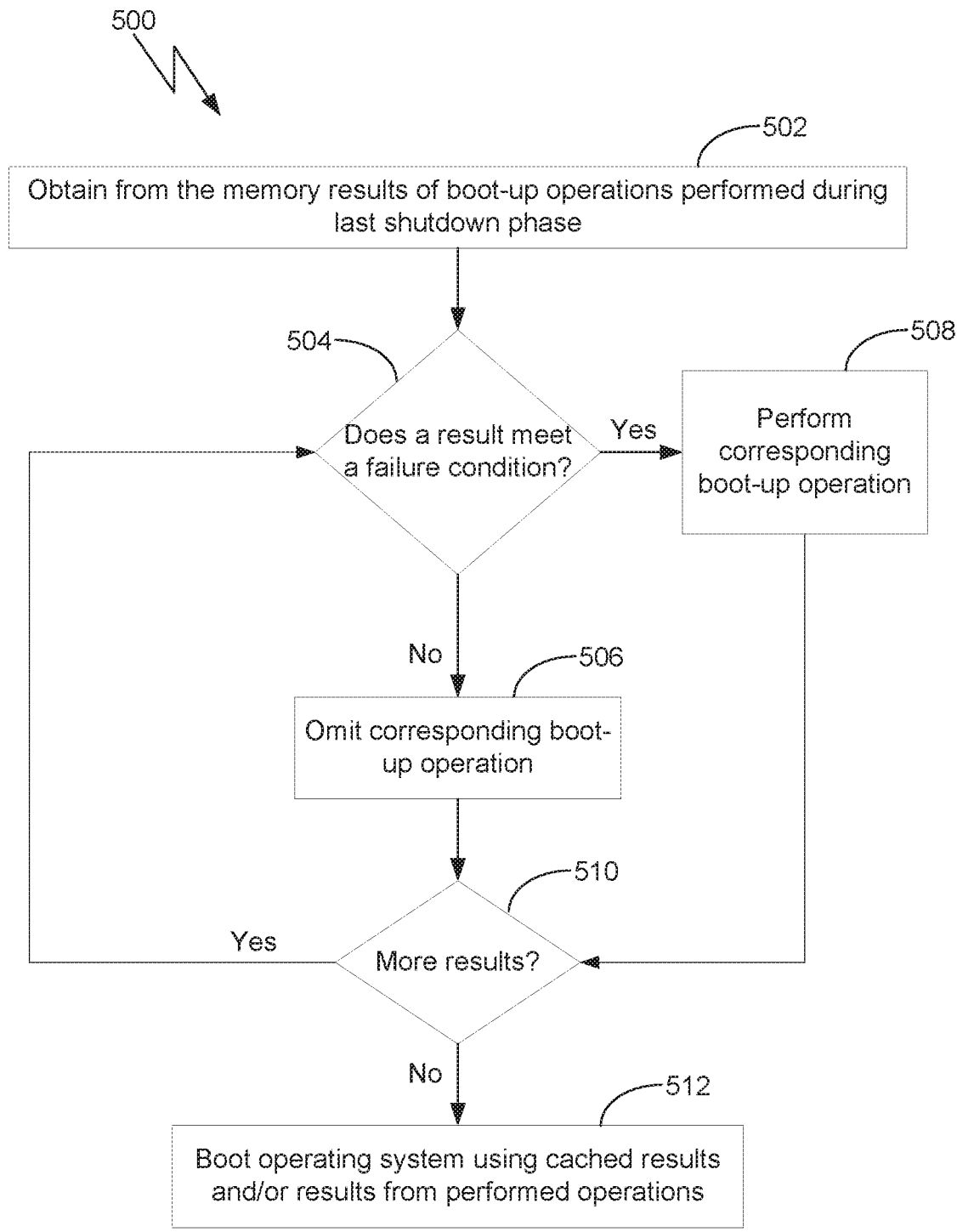
FIG. 5 is a flow diagram illustrating method steps for performing or omitting boot-up operations during a boot up procedure in accordance with some embodiments.

FIG. 5 is a flow diagram illustrating method steps for performing or omitting boot-up operations during a boot up procedure in accordance with some embodiments. Although the method steps are described with respect to the system of FIG. 1, persons skilled in the art will understand that any system configured to implement the method steps, in any order, falls within the scope of the contemplated embodiments.

As shown, a method 500 begins at step 502, where, during a boot-up phase of an operating system 108 at a computing system 100, an operating system 108 (e.g., a boot-up module 110 or a boot-up operations module 114, such as application manager module 202) obtains (e.g., receives) from memory 106 boot-time operations results 118 of boot-time operations performed during the last shutdown phase at the computing system 100.

At step 504, the operating system 108 (e.g., the boot-up module 110 or a boot-up operations module 114) determines whether a respective boot-time operation result 118 meets any of one or more failure conditions. If, at step 504, the operating system 108 (e.g., the boot-up module 110 or a boot-up operations module 114) determines that the result meets any failure condition, then the method 500 proceeds to step 508, where a boot-up operations module 114 performs the boot-up operation corresponding to the result. If, at step 504, the operating system 108 (e.g., the boot-up module 110 or a boot-up operations module 114) determines that the result does not meet any of the failure conditions, then the method proceeds to step 506, where the boot-up operation corresponding to the result is omitted from the boot-up phase. In other words, the boot-up operation is not performed during the boot-up phase.

If, at step 510, the operating system 108 (e.g., the boot-up module 110 or a boot-up operations module 114) determines that there are more boot-time operation results 118, then the method 500 returns to step 504, where the operating system 108 (e.g., the boot-up module 110, or a boot-up operations module 114) determines whether another result meets a failure condition. If, at step 510, the operating system 108 (e.g., the boot-up module 110 or a boot-up operations module 114) determines that there are no more results to check, then the method 500 proceeds to step 512, where the boot-up module 110 boots the operating system 108 using the boot-time operation results 118 that do not meet the failure conditions and/or results corresponding to the boot-up operations performed in step 508.

In some embodiments, prior to step 512, one or more boot-up operation modules 114 performs one or more boot-up operations for which no corresponding results were obtained at step 502. Results generated by these performed operations may be used by the boot-up module 110 in the booting in step 512 as well.

In sum, the operating system performs various boot-up operations during a shutdown phase. The results of these operations are stored in memory. At the next boot-up of the operating system, the operating system receives the stored results. Based on the stored results, the operating system omits performing at least some of the boot-up operations during the boot-up. For the omitted boot-up operations, the operating system instead uses the corresponding stored results for boot-up. Boot-up operations for which no result was stored or for which the result meets a failure condition are performed, and the results of these operations are used by the operating system for the boot-up as well.

Advantageously, the techniques disclosed herein reduce the boot-up time of an operating system. In particular, time consumed by the boot-up operations is shifted to the shutdown phase, when the consumed time is less disruptive to users. By shifting the time to the shutdown phase, and then omitting performing at least some of these operations during the next boot-up phase, the time consumed by the boot-up phase is reduced. As a result, the operating system, and correspondingly the computing system, is ready for use by users more quickly.

1. In some embodiments, a non-transitory computer-readable storage medium includes instructions that, when executed by a processor, cause the processor to perform the steps of, during a shutdown phase of an operating system, performing one or more boot-up operations to generate one or more results, and storing the one or more results in a memory; and during a boot-up phase of the operating system, receiving the one or more results from the memory, and booting the operating system based on the one or more results.

2. The computer-readable storage medium of clause 1, wherein the processor is included in an in-vehicle infotainment system, and the operating system is executed by the processor.

3. The computer-readable storage medium of clause 1 or 2, wherein the one or more boot-up operations comprise one or more of an application parsing operation, an application scanning operation, an application validation operation, and an application optimization operation.

4. The computer-readable storage medium of any of clauses 1-3, wherein performing the one or more boot-up operations comprises performing at least one of the boot-up operations for each of one or more applications.

5. The computer-readable storage medium of any of clauses 1-4, wherein booting the operating system based on the one or more results comprises determining that a first result of the one or more results meets one or more failure conditions; and in response to the determining, performing a boot-up operation associated with the first result during the boot-up phase to generate a second result.

6. The computer-readable storage medium of any of clauses 1-5, wherein booting the operating system based on the one or more results comprises booting up the operating system using the second result.

7. The computer-readable storage medium of any of clauses 1-6, wherein the one or more failure conditions include at least one of an indication that the first result is a failure, an indication that the first result has expired, and an indication that the first result is invalid.

8. The computer-readable storage medium of any of clauses 1-7, wherein booting the operating system based on the one or more results comprises determining that a first result of the one or more results does not meet one or more failure conditions; and in response to the determining, booting up the operating system using the first result.

9. The computer-readable storage medium of any of clauses 1-8, wherein the shutdown phase includes a plurality of sub-phases, and the performing and the storing are performed during a first sub-phase of the plurality of sub-phases.

10. The computer-readable storage medium of any of clauses 1-9, wherein the first sub-phase is preceded by a second sub-phase of the plurality of sub-phases, and further comprising, at the second sub-phase, ceasing processing of events and signals.

11. In some embodiments, an in-vehicle infotainment system comprises a memory storing one or more boot operation modules and one or more installed applications; and a processor that is coupled to the memory and, when executing the one or more boot operation modules, is configured to, during a shutdown phase of the operating system, perform one or more boot-up operations for the one or more installed applications to generate one or more results, and store the one or more results in a memory; and during a boot-up phase of the operating system, receive the one or more results from the memory, and boot the operating system based on the one or more results.

12. The system of clause 11, wherein the one or more boot-up operations comprise one or more of application parsing operations performed for the installed applications, application scanning operations performed for the installed applications, application validation operations performed for the installed applications, and application optimization operations performed for the installed applications.

13. The system of clause 11 or 12, wherein receiving the one or more results from the memory comprises receiving a different result for each of the installed applications.

14. The system of any of clauses 11-13, wherein performing the one or more boot-up operations comprises performing a first operation of the one or more boot-up operations for each of the installed applications to generate a set of results, the set of results including a respective result for each of the installed applications.

15. The system of any of clauses 11-14, wherein booting the operating system based on the one or more results comprises determining that a first result associated with a first installed application meets one or more failure conditions; and in response to the determining, performing the first operation for the first installed application during the boot-up phase to generate a second result.

16. The system of any of clauses 11-15, wherein the one or more failure conditions include one or more of an indication that validation of the first installed application failed, an indication that optimization of the first installed application failed, an indication that the first result has expired, and an indication that the first result is invalid.

17. The system of any of clauses 11-16, wherein booting the operating system based on the one or more results comprises determining that a second result associated with a second installed application of the installed applications does not meet one or more failure conditions; and in response to the determining, booting up the operating system using the second result.

18. The system of any of clauses 11-17, wherein the shutdown phase includes a plurality of sub-phases, and the performing and the storing are performed during a first sub-phase of the plurality of sub-phases, and further comprising, in a second sub-phase of the plurality of sub-phases, ceasing execution of the one or more installed applications, wherein the second sub-phase is prior to the first sub-phase.

19. In some embodiments, a computer-implemented method comprises, during a shutdown phase of an operating system, performing one or more boot-up operations to generate one or more results, and storing the one or more results in a memory; and during a boot-up phase of the operating system, receiving the one or more results from the memory, and booting the operating system based on the one or more results.

20. The method of clause 19, wherein booting the operating system based on the one or more results comprises determining that a first result of the one or more results meets one or more failure conditions; and in response to the determining, performing a boot-up operation associated with the first result during the boot-up phase to generate a second result.

Any and all combinations of any of the claim elements recited in any of the claims and/or any elements described in this application, in any fashion, fall within the contemplated scope of the described embodiments.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed towards embodiments of the present disclosure, other and further embodiments of the disclosure may be devised without departing from the basic scope thereof, and the scope thereof is determined by the claims that follow.

What is claimed is:

1. One or more non-transitory computer-readable storage media including instructions that, when executed by a-one or more processors, cause the one or more processors to perform the steps of:
during a shutdown phase of an operating system:
performing one or more boot-up operations to generate one or more application results associated with operation of one or more applications; and
storing the one or more application results in a memory; and
during a boot-up phase of the operating system:
receiving the one or more application results from the memory; and
booting, based on the one or more application results, the operating system associated with the operation of the one or more applications.

2. The one or more non-transitory computer-readable storage media of claim 1, wherein:
the one or more processors are included in an in-vehicle infotainment system, and
the operating system is executed by the one or more processors.

3. The one or more non-transitory computer-readable storage media of claim 1, wherein the one or more boot-up operations comprise one or more of an application parsing operation, an application scanning operation, an application validation operation, or an application optimization operation.

4. The one or more non-transitory computer-readable storage media of claim 1, wherein performing the one or more boot-up operations comprises performing, for each of the one or more applications, at least one of the boot-up operations.

5. The one or more non-transitory computer-readable storage media of claim 1, wherein booting the operating system based on the one or more application results comprises:
determining that a first result of the one or more applications results meets one or more failure conditions; and
in response to the determining, performing a boot-up operation associated with the first result during the boot-up phase to generate a second result.

6. The one or more non-transitory computer-readable storage media of claim 5, wherein booting the operating system based on the one or more application results comprises booting up the operating system using the second result.

7. The one or more non-transitory computer-readable storage media of claim 5, wherein the one or more failure conditions include at least one of an indication that the first result is a failure, an indication that the first result has expired, or an indication that the first result is invalid.

8. The one or more non-transitory computer-readable storage media of claim 1, wherein booting the operating system based on the one or more application results comprises:
determining that a first result of the one or more application results does not meet one or more failure conditions; and
in response to the determining, booting up the operating system using the first result.

9. The one or more non-transitory computer-readable storage media of claim 1, wherein the shutdown phase includes a plurality of sub-phases, and the performing and the storing are performed during a first sub-phase of the plurality of sub-phases.

10. The one or more non-transitory computer-readable storage media of claim 9, wherein the first sub-phase is preceded by a second sub-phase of the plurality of sub-phases, and further comprising, at the second sub-phase, ceasing processing of events and signals.

11. An in-vehicle infotainment system, comprising:
a memory storing one or more boot operation modules and one or more installed applications; and
a processor coupled to the memory and, when executing the one or more boot operation modules, is configured to:
during a shutdown phase of an operating system:
perform one or more boot-up operations for the one or more installed applications to generate one or more application results associated with operation of the one or more installed applications; and
store the one or more application results in a memory; and
during a boot-up phase of the operating system:
receive the one or more application results from the memory; and
boot, based on the one or more application results, the operating system associated with the operation of the one or more installed applications.

12. The system of claim 11, wherein the one or more boot-up operations comprise one or more of:
application parsing operations performed for the installed applications,
application scanning operations performed for the installed applications,
application validation operations performed for the installed applications, or
application optimization operations performed for the installed applications.

13. The system of claim 11, wherein receiving the one or more application results from the memory comprises receiving a different result for each of the installed applications.

14. The system of claim 11, wherein performing the one or more boot-up operations comprises performing, for each of the installed applications, a first operation of the one or more boot-up operations to generate a set of application results, wherein the set of application results includes a respective result for each of the installed applications.

15. The system of claim 14, wherein booting the operating system based on the one or more application results comprises:

determining that a first result associated with a first installed application meets one or more failure conditions; and in response to the determining, performing the first operation for the first installed application during the boot-up phase to generate a second result.

16. The system of claim 15, wherein the one or more failure conditions include one or more of:

an indication that validation of the first installed application failed, an indication that optimization of the first installed application failed, an indication that the first result has expired, or an indication that the first result is invalid.

17. The system of claim 14, wherein booting the operating system based on the one or more application results comprises:

determining that a second result associated with a second installed application of the installed applications does not meet one or more failure conditions; and in response to the determining, booting up the operating system using the second result.

18. The system of claim 11, wherein the shutdown phase includes a plurality of sub-phases, and the performing and the storing are performed during a first sub-phase of the plurality of sub-phases, and further comprising, in a second sub-phase of the plurality of sub-phases, ceasing execution of the one or more installed applications, wherein the second sub-phase is prior to the first sub-phase.

19. A computer-implemented method, comprising:

during a shutdown phase of an operating system:

performing one or more boot-up operations to generate one or more application results associated with operation of one or more applications; and storing the one or more application results in a memory; and during a boot-up phase of the operating system:

receiving the one or more application results from the memory; and booting, based on the one or more application results, the operating system associated with the operation of the one or more applications.

20. The method of claim 19, wherein booting the operating system based on the one or more application results comprises:

determining that a first result of the one or more application results meets one or more failure conditions; and in response to the determining, performing a boot-up operation associated with the first result during the boot-up phase to generate a second result.

* * * * *